United States Patent

[11] 3,604,215

[72] Inventor Cletus M. Dunn
 Waterford, Conn.
[21] Appl. No. 4,250
[22] Filed Jan. 20, 1970
[45] Patented Sept. 14, 1971
[73] Assignee The United States of America as
 represented by the Secretary of the Navy

[54] METHOD OF LAYING ELECTRICAL CABLE
 2 Claims, 4 Drawing Figs.
[52] U.S. Cl. .................................................. 61/72.2,
 61/72.6
[51] Int. Cl. .................................................. E02f 1/00,
 E02f 5/10
[50] Field of Search .................................. 61/72.1,
 72.2, 72.4, 72.5, 72.6; 307/147, 148

[56] References Cited
 UNITED STATES PATENTS
 166,104  7/1875  Hoffhein ..................... 61/72.6 X
 286,861  10/1883  Speed ......................... 61/72.6 X
 330,724  11/1885  Montgomery ............. 61/72.6 X
 1,006,116  10/1911  Morse ....................... 61/72.6 X
 2,900,931  8/1959  Lisle .......................... 61/72.6
 3,203,188  8/1965  Evans ........................ 61/72.6
 3,349,568  10/1967  Smith et al. ............... 61/72.2
 3,354,660  11/1967  Vaughan ................... 61/72.2
 3,400,542  9/1968  Davis ........................ 61/72.6

*Primary Examiner*—David J. Williamowsky
*Assistant Examiner*—David H. Corbin
*Attorneys*—Richard S. Sciascia, Louis B. Applebaum and Philip Schneider ABSTRACT: Means for and method of laying electrical cable underground and providing a high-conductivity environment therefor, consisting of a cable plow machine plus means to fill the excavated tube in which the cable is laid with a conductive mortar under hydraulic pressure. The latter means include a mixer for mixing the loose soil with a conductive aggregate, cement, water, moisture-attracting gel and a water reduction admixture and mud jack means for forcing the mortar into the excavated tube under pressure.

PATENTED SEP 14 1971  3,604,215

INVENTOR.
CLETUS M. DUNN
BY Philip Schneider
ATTORNEYS

METHOD OF LAYING ELECTRICAL CABLE

STATEMENT OF GOVERNMENT INTEREST

The invention described herein may be manufactured and used by or for the Government of the United States of America for governmental purposes without the payment of any royalties thereon or therefor.

This invention relates to cable-laying machines and especially to a cable-laying machine which fills the space in which the cable is laid with an electrically conductive, moisture-attracting, free-flowing, pressurized mortar.

Grounding electrical systems by sinking conductors into the earth is a conventional practice in the electrical art. This is done in the establishment of electrical substations or radio transmitting antenna ground systems, for example.

To establish good grounding, it is necessary that the earth near the grounding conductors have low resistivity; otherwise it is necessary to insert configurations of wire within the ground. For example, when engineers prepare an area of earth for an electrical substation, they typically measure earth resistivity over a period of time (perhaps a year) and then prepare the area by leveling, backfilling or raising grade levels and compacting. They then measure resistivity again and, if too high, cover the surface with coke chips or cinder "breeze" to prepare a bed for the ground meshes, screens and rods. They install the latter and finish the surface above the grounding wires. Occasionally some connecting cables and the "counterpoise" beneath the transmission lines add to the size of the total ground system.

Where long lengths of wire connect multiple grounds, the usual practice is to trench, or plow, the wires beneath the surface. But in many geographical locations, the surface layers of soil possess a natural electrical resistivity that does not contribute to good electrical grounding, so that very long lengths of wire must be employed and buried to a depth where the soil moisture content and soil chemistry permit best coupling with the metal grounding conductors. Obviously, if the soil could be economically replaced or manipulated to a lower resistivity, the size of the grounding array could be advantageously reduced.

An object of this invention is to provide a good grounding medium for grounding array conductors in any type of soil.

The invention comprises a method for laying a cable in a trench and for simultaneously filling the trench with an electrically conductive moisture-attracting, free-flowing mortar under hydraulic pressure.

Other objects, advantages and novel features of the invention will become apparent from the following detailed description of the invention when considered in conjunction with the accompanying drawings wherein.

Figure 3:
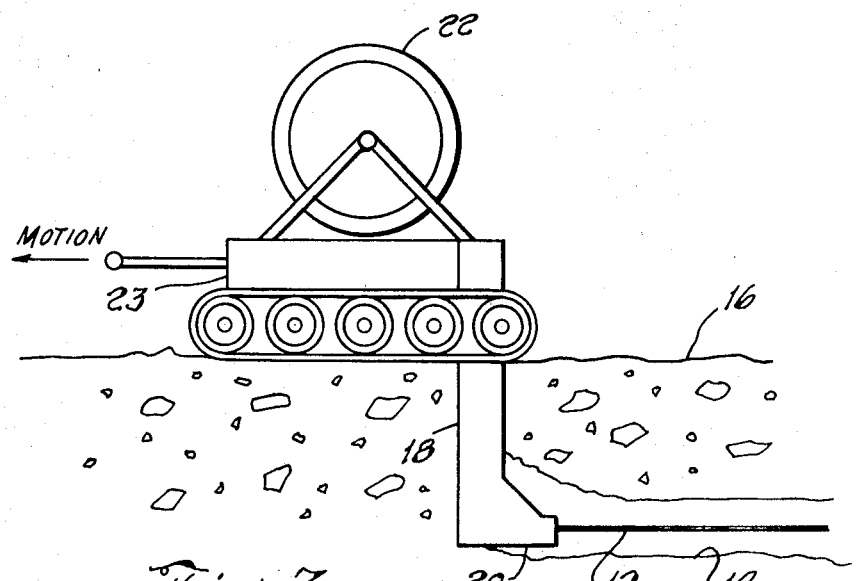
FIG. 3 shows an existing cable plow machine for deep-soil work.

In laying cable in the earth, cable plow machines are employed. A typical cable plow for laying cable 12 in an excavated tube 14 in the ground 16 is shown in FIG. 3. This type of plow is used for deep-soil work in ground which is not too hard. It has a plow blade 18 and plowshare 20 through which the cable 12 is run, the cable 12 being wound on a reel 22 mounted on a wheeled carriage 23 which may be drawn by a tractor.

Figure 4:
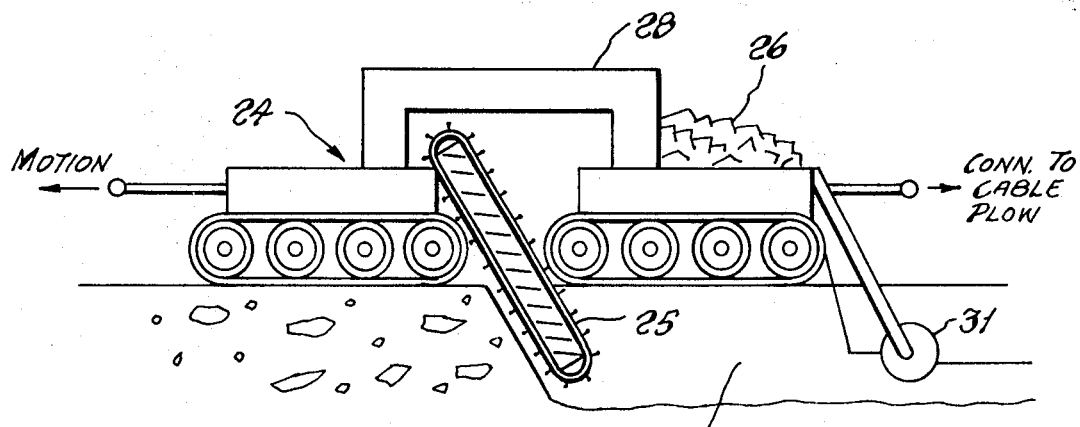
FIG. 4 shows an existing cable plow design for hard soil.

If the soil is hard and contains boulders so that a plow cannot be employed, a trenching machine 24 (see FIG. 4) is used ahead of the plow. The stones are removed from the soil by a trencher 25 and the loose earth 26 is moved to the rear of the machine by a conveyor belt 28. The loose earth 26 is then used to fill the trench 30 to a predetermined level and is compacted by a heavy roller 31. A cable plow, such as shown in FIG. 3, is drawn behind the trenching machine 24.

Figure 1:
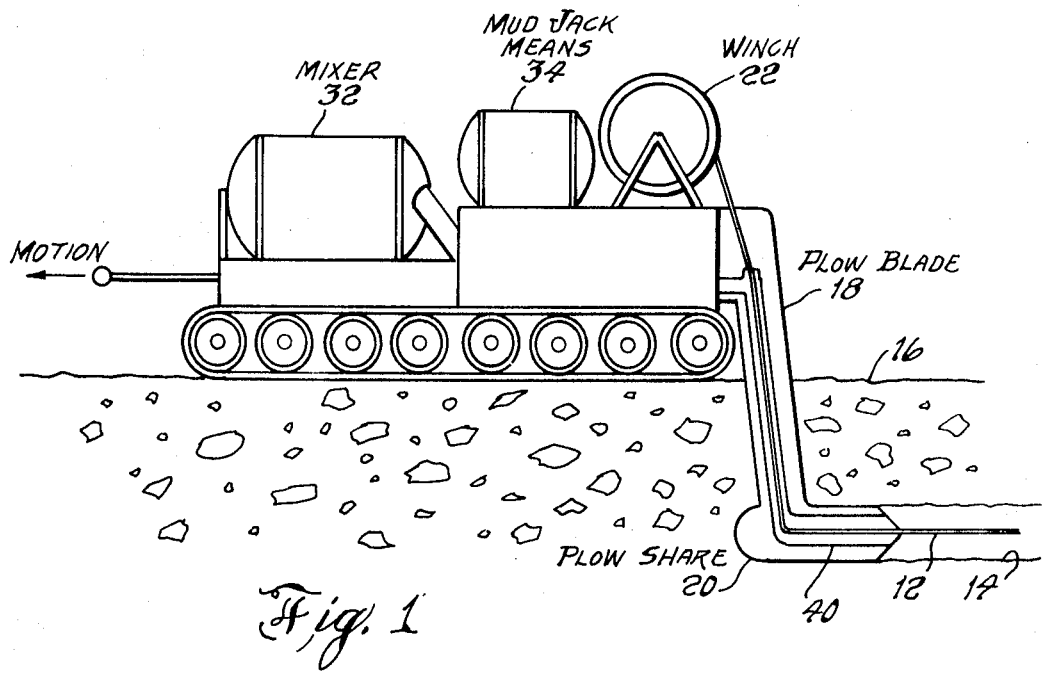
FIG. 1 is a schematic diagram showing a side view of the plowing machine.

An embodiment of the present invention is shown schematically in FIG. 1. Here a mixer 32, mud jack means 34, cable reel, or winch, 22, and power source 36 (not shown) are mounted on the wheeled carriage which draws the plow behind it. The plow blade 18 and share 20 are hollow so that the cable 12 and mortar-carrying piping 40 can pass through the plow. The piping 40 is connected to the mud jack means 34 and to an outlet (not shown) at the back end of the plowshare 20. The cable 12 comes out of another outlet, or port, (not shown) at the back end of the share 20. The machine can be used alone in softer soils or can be hooked behind a trenching machine 24 for harder soils.

Figure 2:
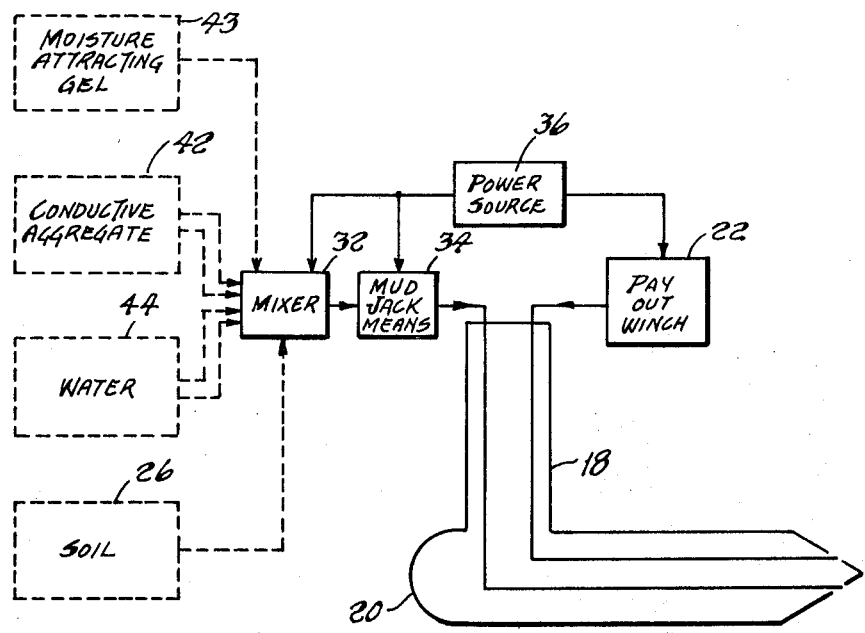
FIG. 2 is a partial block diagram of an embodiment of the invention.

The machine is shown in block diagram in FIG. 2. Conductive mortar ingredients, comprising a conductive mixture or aggregate 42, moisture-attracting gel 43, water 44 and loose soil 26 are fed to the mixer 32 where they are mixed to produce the bulky low-resistivity mortar. The mortar then passes to the mud jack means 34 which includes hydraulic compression means for forcing the mortar, under pressure, through the piping 40 into the tube 14 in which the cable is being laid by the winch 22. The mixer 32, mud jack means 34 and winch 22 are energized by a power source 36. The tube 14 is thus filled with mortar which contains ingredients which draw and maintain pore moisture throughout the volume surrounding the cable, thus maintaining the desired pore fluidity through the extremes of soil temperature and seasonal dryness. Moreover, because of the hydraulic pressure under which the mortar is forced into the underground tube, the mortar makes intimate contact with all metal surfaces, squeezes out water and air from the soil, and compacts with the undisturbed soil, thereby forming an excellent grounding medium.

The moisture-attracting gel 43 may, for example, comprise a mixture of acrylamide and N-N' -methylene-bisacrylamide such as American Cyanamid's AM-9 mixture.

The conductive aggregate 42 is preferably a coke breeze sand type of mixture, using Portland cement for strength, coke breeze sand for conductivity and a water reduction ingredient (WRA) to increase workability. The soil 26 is used as a filler.

Various formulas for the mortar are possible; two typical ones are provided below. The first has a water cement (W/C) ratio (by volume) of 0.55 and the second a W/C ratio (by volume) of 1.50. Conductivity of the mortar increases with increasing W/C ratio but the lower W/C ratio has better strength.

|  | I | II |  |
| --- | --- | --- | --- |
| W/C ratio | 0.55 | 1.50 |  |
| Water | 536 | 669 | lb/cu.yd. |
| Portland cement | 969 | 448 | lb/cu.yd. |
| Coke Breeze Sand and Soil Filler | 1329 | 1367 | lb/cu.yd. |
| WRA | 1083 | 511 | cc/cu.yd. |

If the soil which is dug up by the cable plow machine is of very low conductivity, it can be discarded and clay-silt soil used as a filler in its stead. Clay-silt soil provides optimal conductivity characteristics.

It should be noted that the mortar surrounding the bare grounding conductor should remain porous enough to allow capillary flow between ground water source and the surface of the conductor. The hardened or set mortar would not become adversely resistive if the clay-silt soil to coke breeze sand ratio remained less than 1-to-1, but might become adverse with a 10-to-1 ratio (i.e., worse than the resistivity if the bare wire were simply embedded in clay-silt soil alone). Moreover, for the proposed purpose herein where construction strength is not needed, Portland cement could be dispensed with. However, its use, even in reduced ratios, might prevent soil and coke breeze sand separation due to their different specific gravities.

Obviously many modifications and variations of the present invention are possible in the light of the above teachings. It is therefore to be understood that within the scope of the appended claims the invention may be practiced otherwise than as specifically described.

I claim:

1. A method for producing an electrically conductive environment for underground cables comprising the steps of:
   plowing a tubelike excavation in the earth;
   laying a bare, conductive cable in said excavation; and
   simultaneously with said cable laying, filling said excavation with a pressurized, electrically conductive, moisture-attracting free-flowing mortar, said mortar encasing said bare cable.

2. A method for producing an electrically conductive environment for underground cables comprising the steps of:
   plowing a tubelike excavation in the earth;
   forming an electrically conductive, moisture-attracting free-flowing mortar including water, moisture-attracting gel, soil and a material having high electrical conductivity;
   laying a bare, conductive cable in said excavation; and
   simultaneously with said cable laying, filling said excavation with said mortar under pressure.